G. H. GILMAN & W. C. MICHAEL.
PRESSURE FED TOOL.
APPLICATION FILED DEC. 24, 1908.
1,172,238.
Patented Feb. 15, 1916.
2 SHEETS—SHEET 2.
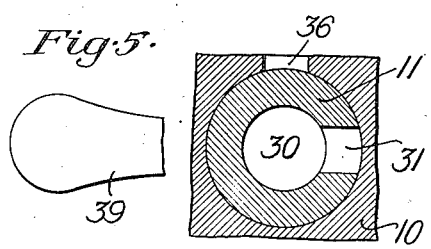
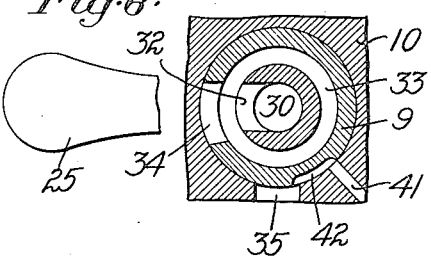
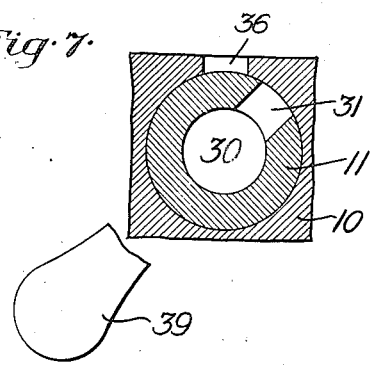
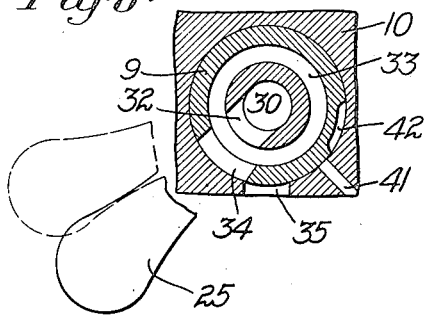
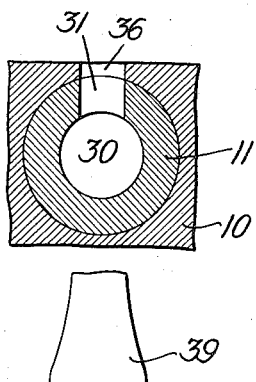
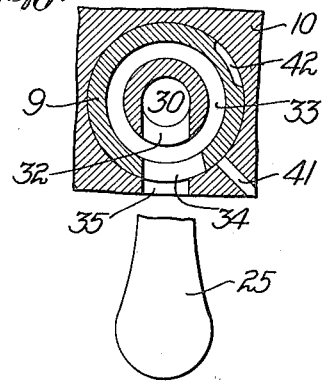
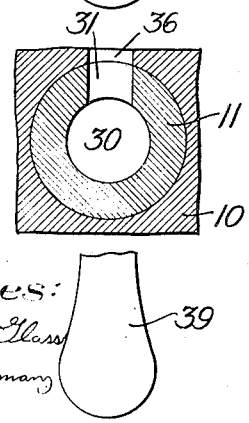
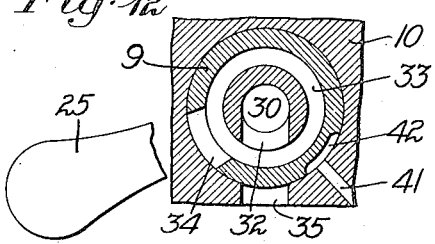
Witnesses:
William C. Glass
Horace H. Croseman
Inventors:
George H. Gilman
William C. Michael
by Emery & Booth Att'ys

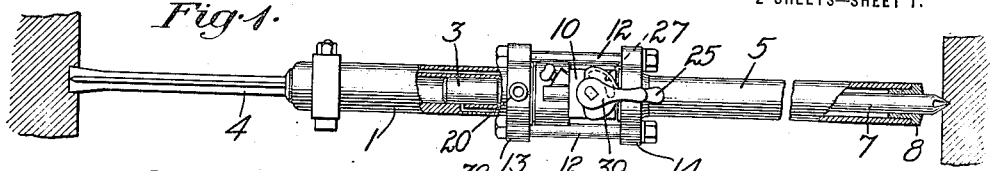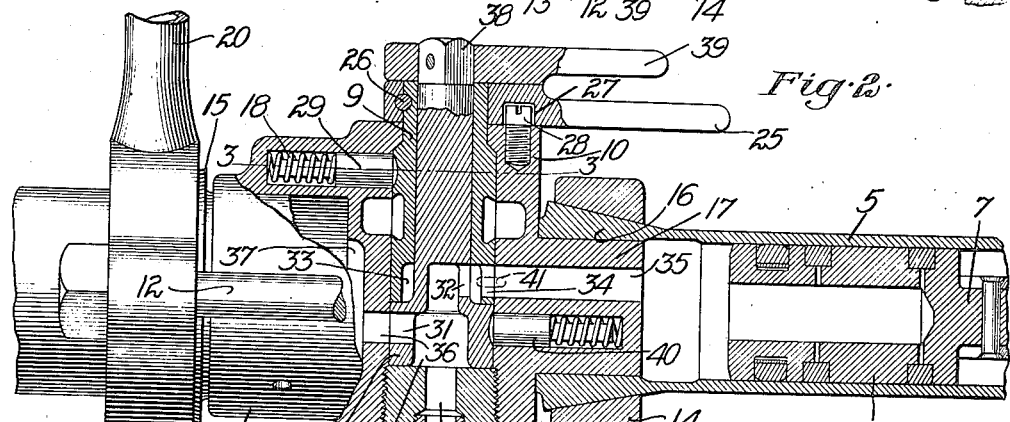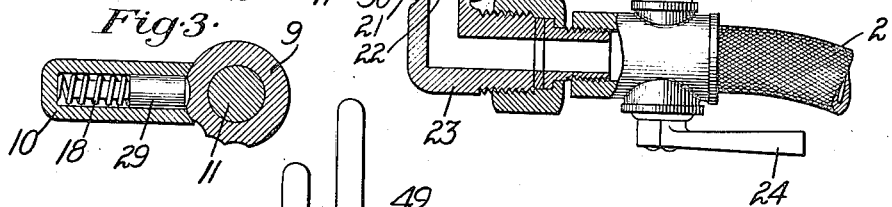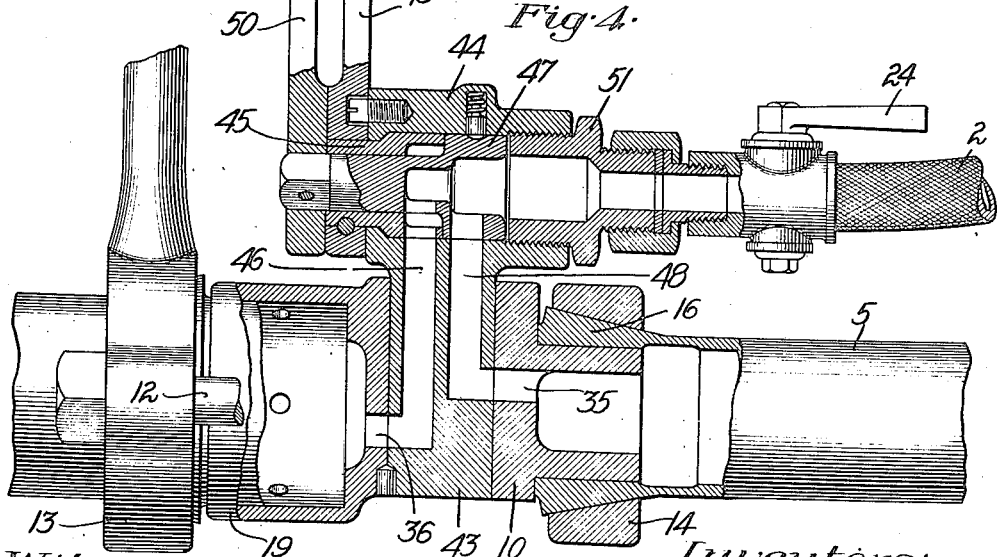

UNITED STATES PATENT OFFICE.

GEORGE H. GILMAN AND WILLIAM C. MICHAEL, OF CLAREMONT, NEW HAMPSHIRE, ASSIGNORS, BY MESNE ASSIGNMENTS, TO SULLIVAN MACHINERY COMPANY, OF BOSTON, MASSACHUSETTS, A CORPORATION OF MASSACHUSETTS.

PRESSURE-FED TOOL.

1,172,238.

Specification of Letters Patent. Patented Feb. 15, 1916.

Application filed December 24, 1908. Serial No. 469,067.

*To all whom it may concern:*

Be it known that we, GEORGE H. GILMAN and WILLIAM C. MICHAEL, both citizens of the United States, and residents of Claremont, in the county of Sullivan and State of New Hampshire, have invented an Improvement in Pressure-Fed Tools, of which the following description, in connection with the accompanying drawings, is a specification, like letters on the drawings representing like parts.

Our invention relates to pressure-actuated tools, being more particularly concerned with the provision of improved feed devices for such tools and with improvements in the pressure-actuated controlling valves for the tools themselves.

Our invention will be best understood by reference to the following description when taken in connection with the accompanying illustration of one specific embodiment thereof, while its scope will be more particularly pointed out in the appended claims.

In the drawings: Figure 1 shows in plan, partly broken away, a pressure fed hammer drill embodying one form of our invention; Fig. 2 is a longitudinal section in elevation, on an enlarged scale, of the parts adjoining the controlling valves for the feed and tool in the apparatus shown in Fig. 1; Fig. 3 is a sectional detail in plan taken on the line 3—3 in Fig. 2; Fig. 4 is a sectional elevation similar to Fig. 2, but showing a modified form of our invention; and Figs. 5 to 12 inclusive represent different positions of the valves and their controlled ports which may be employed in securing different actions for the feed and hammer drill.

Referring to the drawings and to the embodiment of our invention there disclosed for illustrative purposes, we have there shown a pneumatic tool herein of the hammer drill type having the cylinder 1 so connected to suitable pressure-actuated feeding apparatus that the pressure fluid supplied thereto through the pipe 2 (Fig. 2) acts not only to move the hammer piston 3 against the shank of the cutter bit or drill 4, but also acts initially to advance the tool toward the work and hold the drill forcibly pressed against the same while the tool is in operation, all as represented in Fig. 1.

While pressure-actuated feeding means of any suitable construction may be employed, herein we have provided a feeding cylinder 5 adapted to coöperate with a suitable feeding piston 6 contained therein. Either the piston or cylinder, as desired, may be connected to the tool, the remaining part serving to support the apparatus either by abutment against a wall or other support (as in Fig. 1) or by direct attachment to some fixed object. In the present instance the cylinder 5 is secured to the tool to move therewith on the piston, the latter having the piston rod 7 which projects through the plug 8 fixed in the end of the cylinder and provided with a foot or pointed end adapted to secure a firm hold in the rock. In the present form of apparatus the pressure fluid for actuating the feed is controlled by means of a throttle valve 9, herein in the form of a sleeve mounted transversely in the connecting piece 10 interposed between and rigidly secured to the feed cylinder 5 and the tool cylinder 1. The pressure fluid for actuating the tool, on the other hand, is controlled by a separate and independent throttle valve 11 arranged coaxially with the throttle valve 9 but capable of either independent or simultaneous movement.

Before referring to the detailed construction of the two throttle valves, it may be noted that the connecting piece or head block 10 acts as a rigid connecting piece between the tool and the feed cylinders by means of the tie bolts 12 provided with suitable nuts and which serve to draw together the clamping collars 13 and 14. The collars are provided with interiorly tapered seats engaging the flared or tapered walls 15 and 16, respectively, formed on the tool cylinder 1 and the feed cylinder 5. The forward end of the feed cylinder 5 by this means is drawn up rigidly over a reduced projecting portion 17 on the connecting piece, while the rear end 18 of the hammer drill is drawn snugly into a shell 19 formed at the opposite side of the connecting piece.

The forward collar 13 is provided with a radially projecting handle 20 by means of which rotative movement may be imparted to the tool during operating thereof.

Referring now to the throttle valves which control the pressure feed in the tool, the connecting piece is provided with a transverse pocket or bore which receives the sleeve feed throttle 9, the same being held within the bore by the tapered plug 21 having the central fluid admission passage 22 and connected with the feed pipe 2 by means of the angle connection 23, a hose line throttle valve 24 of ordinary construction being preferably employed between the pipe 2 and the apparatus.

At its opposite end the sleeve throttle 9 has a reduced portion which projects out of the connecting piece, such portion being rigidly secured to the operating handle 25, as by means of the pin 26. Preferably the inner face of the handle hub is provided with a segmental groove 27 which coöperates with a fixed stud 28 on the walls of the connecting piece, such groove being of sufficient length to permit the desired range of movement of the handle 25, but to limit its movement to such range. To position the valve in the various positions to which it will be customarily turned while, at the same time, permitting graduated movement thereof, there is employed suitable means, such as the spring-pressed positioning pin 29 working in a lateral pocket in the connecting piece and pressed against the outer walls of the throttle valve, which latter (Fig. 3) is provided with a plurality of depressions adapted to receive the end of the pin.

From the admission aperture 22 the pressure fluid enters a chamber 30 formed in the cup-shaped end of the tool throttle valve 11, which latter is provided with a single radial port 31 serving to control the fluid supply to the hammer drill. The chamber 30 is prolonged into the stem of the tool throttle, where it is connected through the permanently open aperture 32 with the annular chamber 33 surrounding the stem and formed by the cup-shaped end of the outer feed throttle valve 9. The admission of pressure fluid to the feed cylinder is controlled by means of the single radial port 34 in the walls of the sleeve throttle 9. When the said port is turned to register with the passage 35 leading through the walls of the connecting piece to the feed cylinder, pressure fluid is admitted to the feed cylinder, such admission being wholly unaffected by the position of the tool throttle, since the annular chamber 33 is at all times open to the pressure fluid supply. Likewise, when the port 31 in the tool throttle is brought into registration with the tool admission passage 36 pressure fluid is admitted to the pressure chamber 37 of the hammer drill, causing actuation of the same. This also is wholly independent of and unaffected by the position of the feed throttle valve, since the chamber 30 is at all times open to the pressure fluid supply. The particular construction of the hammer drill and its controlling valve is of no essential importance and the details thereof are not shown, it being understood that any suitable form of tool may be employed, such, for example, as that shown in patent to Gilman No. 902,288.

The stem of the tool throttle is prolonged through the sleeve 9 and is provided with an outer squared end 38 to which is secured the controlling handle 39 by which the valve may be turned independently of the feed valve. To assist in positioning the tool throttle, there may also be employed a spring-pressed positioning pin 40 located in the walls of the connecting piece and engaging a series of depressions in the enlarged lower end of the tool throttle.

To place the feed cylinder in communication with the atmosphere, when desired, suitable means are provided, such as a duct or passage 41 (Figs. 2 and 6), extending laterally through the walls of the connecting piece surrounding the throttle valve and adapted to be placed in communication with the feed cylinder passage 35 in certain positions of the valve by means of a groove or pocket 42 on the side of the valve, such being shown in Figs. 5 to 12.

Referring now to Figs. 5 to 12 inclusive, the movement of the throttle valves for controlling the apparatus in the usual relation of the feed and tool will now be explained.

When the tool is out of use both throttle valve handles 39 and 25 are turned to the position shown in Figs. 5 and 6, pressure fluid in the supply chamber 30 being shut off from access both to the tool and feed cylinder, and the latter being, at the same time, connected with the atmosphere through the atmospheric passage 41, valve groove 42 and the cylinder passage 35. The tool may be left in this condition while out of use or transported from place to place, or set up preparatory to use.

Preparatory to drilling it is usual to position the drill by admitting a slight initial pressure to the feed so as to accurately position the tool before pressure is admitted to the hammer. For this step in the operation the feed throttle handle 25 may be turned to the dotted line position shown in Fig. 8 and then slowly advanced to the full line position there shown to admit sufficient pressure to advance the tool slowly toward the work. In Fig. 8 the port 34 is shown as just admitting pressure fluid to the cylinder passage 35, the amount of admission being variable at will. At the same time the atmospheric passage 41 is cut off from the feed cylinder. With the tool positioned it is then usual to start the hammer in operation to spot the hole before full pressure is turned on to the tool. With the described arrangement of valves the feed throttle may be turned either to the position shown in Fig.

8 or the full-on position shown in Fig. 10, or to any intermediate position while, at the same time, without reference thereto the tool throttle handle 39 may be moved to admit a small amount of pressure fluid to the tool and spot the hole, after which the tool throttle handle may be moved to the full-on position shown in Fig. 9 with the tool operating under full power.

To provide against too great a feed pressure under certain conditions of work where soft or hollow spots are encountered it is frequently desirable to diminish the feeding effort. In the present instance this may be done by turning back the feed throttle (as shown in Fig. 12) so as to shut off the cylinder passage 35 from the supply pressure and thereby trap in the cylinder the accumulated fluid which forms a feeding cushion sufficient to press the tool toward the work, but losing its effect if the tool suddenly jumps forward by breaking through the rock. Such control of the feed throttle, it will be seen, may be had entirely independent of the tool throttle, and the feed throttle may be moved to the position shown in Fig. 12 where it merely traps the pressure fluid in the feed cylinder, or to a point beyond such position where it opens the feed cylinder to the atmosphere for a greater or less interval and still further reduces the feeding pressure. It will be seen, therefore, that the graded and differential control over the tool and the feed, which is required by the several steps of positioning the tool, spotting the hole, drilling the hole, and variations in the feed pressure, is secured easily and readily by the use of these two valves and with greater flexibility of control than in the case of a single valve performing both functions, the two independent valves, however, being so arranged that their manipulation is as convenient as, while their construction is less complicated than, that of the single throttle vale.

It will also be evident that the location of the handles adjacent each other, and more especially because of the fact that they are capable of movement in the same general direction, makes it possible to grasp both simultaneously with one hand and manipulate them as one piece, or to manipulate them separately, and thus conjointly or independently control the feeding device and the hammer drill.

In Fig. 4 we have shown a modified form of the invention wherein the two throttle valves, which are of essentially the same construction as previously described, are mounted in a member separate from and outside of the connecting piece. For this purpose the connecting piece 10 receives a plug 43, the plug terminating in a sleeve 44 exterior to the head block and adapted to receive the throttle valves in much the same relation as the same are carried by the head block in the apparatus of Fig. 2, except for the fact that the valves occupy a reverse relation, the outer sleeve-shaped valve 45 acting to control the passage 46 leading through the said plug to the hammer drill admission passage 36, and the remaining valve 47 acting to control the passage 48 which connects with the feed cylinder passage 35. Herein the tool throttle is controlled by the inner handle 49, and the feed throttle by the outer handle 50 instead of reversely as in the apparatus of Fig. 2. Pressure fluid is introduced from the hose line through the centrally apertured plug 51 threaded into the end of the sleeve 44. The operation of the valves in their control of the tool and feed will be understood from the preceding description.

While we have herein shown and described for the purpose of illustration one concrete form or embodiment of our invention, it is to be understood that the same is not limited to the details of construction, or relative arrangement of parts, or to the application herein made of the various features thereof, but that the same may be modified within wide limits without departing from the spirit of the invention.

Having thus described our invention, what we claim is:

1. In a pressure fed tool, the combination with a pressure fluid feeding device, of a tool cylinder, a piston working in said cylinder, intermediate connecting means to connect the feeding device and cylinder rigidly, independently operable valves in said connecting means, one for the tool and the other for the feeding device, and grasping handles for both of said valves located externally of said intermediate connecting means and both having an operating movement in the same general direction.

2. In a pressure fed tool, the combination with a hammer drill, of a pressure fluid feeding device attached thereto and independently operable valves having independent outlets leading respectively to the feeding device and hammer drill, said valves having overlying handles and serving one to control the feeding device and the other the hammer drill.

3. In a pressure fed tool, the combination with a hammer drill of a pressure fluid feeding device attached thereto and independently operable valves arranged coaxially with each other and serving one to control the feeding device and the other the hammer drill.

4. In a pressure fed tool, the combination with a pressure fluid hammer drill, of a pressure fluid feeding attachment secured thereto, a plurality of independently operable valves one for the tool and the other for the feeding attachment and serving to admit pressure fluid to or exhaust the same from the tool independently of its admission to or exclusion from the feeding attachment, and a plurality of grasping handles connected to said valves located on the same side of said tool and arranged adjacent each other.

5. In a pressure fed device the combination with a pressure fluid hammer drill of a valve for admitting pressure fluid to or excluding the same therefrom a pressure feeding attachment secured thereto, said attachment being provided with a feeding cylinder, an independently operable valve for said feeding attachment having a plurality of positions and serving to open said attachment to the atmosphere or to the fluid pressure, or to close the same both to the atmosphere and the fluid pressure at will, while permitting in each position the admission of fluid pressure to or its exclusion from the tool and separate means located externally of said device for independently controlling the operation of said valves, there being a single supply passage leading to both valves, and separate inlet passages leading from said valves to said hammer drill and feeding attachment, respectively, said valves being interposed between said supply passage and said inlet passages and one valve admitting pressure fluid by way of the other valve to the inlet passage controlled thereby.

6. In a pressure feed device the combination with the tool cylinder 2 of the feed cylinder 5, the tool controlling valve 11 and the independently operable feed valve 9 having its handle in juxta position to that of the tool valve.

7. In a pressure-fluid feeding apparatus, the combination with a hammer drill, of a feeding device comprising a feed piston, a feed cylinder, a rigid connecting device for connecting the feed cylinder to the hammer drill, and independently operable valves one feeding pressure fluid by way of the other, said valves controlling the supply of pressure fluid to the feeding device and the hammer drill.

8. In a pressure feeding device the combination with a hammer drill of a pressure fluid feeding device attached thereto, a pair of independently operable valves arranged co-axially with each other, and means for admitting pressure-fluid to the interior of said valves, one of said valves serving to distribute pressure fluid to the feeding device and the other to the hammer drill.

9. In a pressure feeding apparatus the combination with a hammer drill of a feeding device comprising a feed piston, a feed cylinder, a rigid connecting device for connecting the feed cylinder to the hammer drill, a controlling valve for controlling the admission of pressure fluid to the hammer drill and an independent controlling valve for controlling the feeding device, said valves having their handles in juxta-position, whereby they may be coöperatively moved either together or independently.

10. In a pressure fed tool, the combination with a feeding device, of a tool cylinder, intermediate connecting means to connect the feeding device and cylinder rigidly, and independently operable valves one within another in said connecting means, one for the tool and the other for the feeding device.

11. In a pressure fed tool, the combination with a hammer drill of a pressure fluid feeding device attached thereto, and independently operable valves arranged one within another, and serving one to control the feeding device and the other the hammer drill.

12. In a device of the class described, the combination with a tool, of a pressure fluid feeding device attached thereto, and independently operable valves arranged one within the other, and serving one to control the feeding device and the other the tool.

13. In a device of the class described, the combination with a tool, of a pressure fluid feeding device attached thereto, and independently operable valves coaxially arranged one within the other, and serving one to control the feeding device and the other the tool.

14. In a device of the class described, the combination with a tool of a pressure fluid feeding device attached thereto, and valves provided with grasping handles arranged for conjoint or independent operation at the will of the operator, one valve having an outlet leading to the feeding device, and serving to control the feeding device and the other having an outlet leading to the tool and serving to control the latter.

15. In a device of the class described, the combination with a tool, of a pressure fluid feeding device attached thereto, and valves provided with pivoted grasping handles whose pivots are coaxially arranged for conjoint or independent operation at the will of the operator, one valve serving to control the feeding device and the other the tool.

16. In a pressure fed tool, the combination with a feeding device, of a tool cylinder, intermediate connecting means to connect the feeding device and cylinder rigidly and independently operable valves coaxially arranged in said connecting means, one for the tool and the other for the feeding device.

17. In a pressure fed tool, the combina with a feeding device, of a tool cylinder, intermediate connecting means to connect the feeding device and cylinder rigidly, and valves in said connecting means, one for the tool and the other for the feeding device, said valves having pivoted grasping handles whose pivots are coaxially arranged for conjoint or independent control of said valves.

18. In a pressure tool, the combination with a feeding device, of a tool cylinder, intermediate connecting means to connect the feeding device and cylinder rigidly, and valves in said connecting means, one controlling a supply passage for the tool and the other controlling an independent supply passage for the feeding device, said valves having grasping handles arranged for conjoint or independent control of said valves.

19. In a pressure fed tool, the combination with a hammer drill, of a pressure fluid feeding device attached thereto, and valves having coaxially arranged overlying handles and serving one to control the feeding device and the other the hammer drill.

20. In a pressure fed tool, the combination with a hammer drill, of a pressure fluid feeding device attached thereto, and valves controlling separate passages leading respectively to the hammer drill and feeding device, said valves having handles arranged adjacent each other for conjoint or independent control of the feeding device and the hammer drill.

21. In a pressure fed tool, the combination with a hammer drill, of a pressure fluid feeding device therefor, a plurality of concentrically arranged valves for controlling the feeding device and the hammer drill, and means to hold said valves in the desired positions of adjustment.

22. In a pressure fed tool, the combination with a hammer drill, of a pressure fluid feeding device therefor, a plurality of concentrically arranged valves for controlling the feeding device and the hammer drill, and separate and distinct means to hold each of said valves in a plurality of predetermined positions of adjustment.

23. In a device of the class described, the combination with a tool cylinder, of a pressure fluid feeding device attached thereto, and two independently operable valves arranged one with the other, and serving one to control the feeding device and the other the tool, one of said valves being provided with a chamber surrounding the other, and the other being provided with two passages one of which is arranged to communicate with the tool cylinder through said chamber and the other of which is arranged to communicate with said feeding device.

24. In a device of the class described, the combination with a tool cylinder of a pressure fluid feeding device attached thereto, two independently operable valves arranged one within the other, and serving one to control the feeding device and the other the tool, one of said valves being provided with a chamber surrounding the other, and the other being provided with a central chamber and two passages leading outwardly therefrom, one arranged to communicate with the tool cylinder through said surrounding chamber, and the other arranged to communicate with said feeding device.

25. In a device of the class described, the combination with a tool cylinder of a pressure fluid feeding device attached thereto, two independently operable valves arranged one within the other, and serving one to control the feeding device and the other the tool, one of said valves being provided with a chamber surrounding the other, and a passage leading from said chamber arranged to communicate with said feeding device, and the other valve being provided with a central chamber and two passages leading outwardly therefrom, one communicating at all times with said surrounding chamber, and the other arranged to communicate with said tool.

26. In a device of the class described, the combination with a tool cylinder, of a pressure fluid feeding device attached thereto, two independently operable valves arranged one within the other, and serving one to control the feeding device and the other the tool, one of said valves being provided with a chamber surrounding the other, and the other being provided with two passages, one of which is arranged to communicate with the tool cylinder through said chamber, and the other of which is arranged to communicate with said feeding device, and means having an atmospheric passage controlled by one of said valves and adapted to be placed thereby in communication with said feeding device.

27. In a device of the class described, the combination with a tool cylinder, of a pressure fluid feeding device attached thereto, two independently operable valves arranged one within the other, and serving one to control the feeding device and the other the tool, one of said valves being provided with a chamber surrounding the other, and the other being provided with two passages, one of which is arranged to communicate with the tool cylinder through said chamber and the other of which is arranged to communicate with said feeding device, and a casing for said valves provided with an atmospheric passage under the control of the valve controlling the feeding device and adapted to be placed in communication with said feeding device.

28. In a pressure fed tool, the combination with a hammer drill, of a pressure fluid feeding device therefor, a plurality of concentrically arranged valves for controlling the feeding device and the hammer drill, unitary conduit means for supplying pressure fluid to said valves, and plural conduit means for conducting pressure fluid from said valves.

29. Drilling apparatus comprising in combination, a drilling engine, a pressure fluid feeding device therefor, a plurality of concentrically arranged valves for controlling the feeding device and the drilling engine, common conduit means for supplying pressure fluid to said valves, and a plurality of ports for conducting pressure fluid from said valves to said feeding device and said drilling engine.

30. Drilling apparatus comprising in combination, a drilling engine, a pressure fluid feeding device therefor, a plurality of concentrically arranged valves for controlling the flow of pressure fluid to the feeding device and the drilling engine, means for moving one of said valves relative to another of said valves, and means for moving said valves while maintaining a fixed relation to each other.

In testimony whereof, we have signed our names to this specification, in the presence of two subscribing witnesses.

GEORGE H. GILMAN.
WM. C. MICHAEL.

Witnesses:
J. A. BRUCE,
E. J. BURCHARD.